May 21, 1935.

W. JONES

Re. 19,577

PURIFICATION OF SEWAGE AND OTHER LIQUIDS

Original Filed Aug. 8, 1919

Inventor
Walter Jones,
deceased,
by
Activated Sludge, Inc.
assignee.
By Williams, Bradbury, McCaleb & Hinkle. Attys.

Reissued May 21, 1935 Re. 19,577

UNITED STATES PATENT OFFICE 19,577

PURIFICATION OF SEWAGE AND OTHER LIQUIDS

Walter Jones, deceased, late of Stourbridge, England, by Activated Sludge, Inc., Chicago, Ill., assignee, a corporation of Delaware Original No. 1,341,561, dated May 25, 1920, Serial No. 316,224, August 8, 1919. Application for reissue February 16, 1935, Serial No. 6,912

4 Claims (Cl. 210—8)

Figure 1:
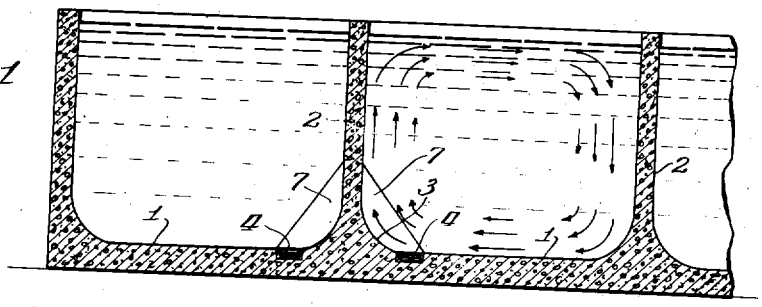

This invention has reference to systems of purifying sewage and analogous impure liquids, in which the liquid being purified has air introduced into it, which passes through it, in the form of bubbles, and the liquid is circulated (in some cases the circulation being effected by the air so introduced into it), and the purification is effected by aerobic bacteria and similar forms of germ life which are associated with sludge in the liquid, and in the air, by which they are kept active and vigorous, and their purifying power maintained at a high state of efficiency.

In processes of the character referred to the commercial or industrial value of them depends in a large measure upon the working costs of the process, of which that of moving or forcing the air used is one of the chief; and it has been proposed in systems of the character concerned to diminish the quantity of air used and moved, by closing the treating tanks above and causing thereby the air to be retained in the liquid a greater length of time, and so that the duration of its action upon the liquid and bacterial sludge will be proportionately increased. That is, the air which is contained in the liquid, upon reaching the upper surface of the liquid, cannot immediately escape from it and as the liquid is circulated in the tanks or tank compartments, it is carried in and by the horizontally flowing upper portion of the liquid, and then also carried downward. The closing of sewage tanks, however, is objectionable on several grounds, and one of the objects of the present invention is to provide a construction which, while the duration of retention of the air in the sewage shall be increased and thereby its action increased before it passes away from same, the necessity of closing the tanks or tank compartments is obviated; and in effecting this object, the mode of constructing the tanks and carrying on the process within them, hereinafter described, is employed.

The tanks or tank sections are formed or provided at the bottom with curved surfaces of large radius at the corners where the current is to be directed from the horizontal direction to the vertical direction, the bottom being flat; so that the stream flowing in a vertical direction downward is gradually bent and directed to pass to and flow in a horizontal direction; and in the case where the up-stream produced by the discharge of air into the liquid takes place near one wall of the tank, the bottom is also similarly curved at the corner near that wall, so as to bend upward and direct the current. By these means the stream is controlled and directed by the bottom formation of the tank, and the air or a great part of it is carried across the top of the tank by the horizontal stream which flows from one side to the other. Further, the upper part of the tanks or tank sections may be provided with an overhanging flow directing means, so as to guide and control the direction of current of liquid and air passing upward, and so that here also it is positively and gradually controlled and changed in a direction from the vertical to the horizontal; the plane of the under surface of these directing overhanging parts or means, and that of the level of the liquid, being practically the same. The overhanging directing parts are relatively short, and inside their surfaces are curved to a large radius, as stated, from the vertical to the horizontal; and they are provided on each side of, or across, the tanks or tank sections, and the receiving overhanging curved part receives the horizontal current or flow, and bends and directs it downward gradually into the downward vertical direction.

Between the overhanging directing parts the tanks are open above, but, as stated, the direction means at each side of the tank are sufficient to cause the liquid to flow horizontally and to carry with it across the tank, and also down again, a very substantial proportion of the air delivered into it, and so the prolongation of retention of the air is accomplished; and by this means the sweep of the liquid over the floor is such that practically no deposit or accumulation of bacterial sludge takes place on it, in consequence of which the sludge does not become deteriorated, which would be inimical to the efficiency of this bacterial sewage purification and treatment.

Figure 2:
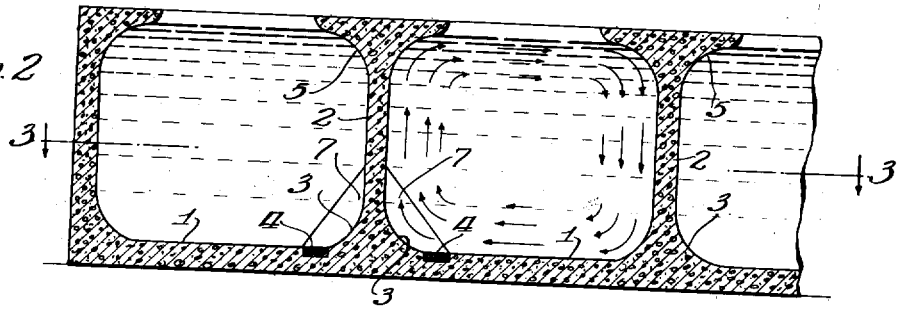
Figure 3:
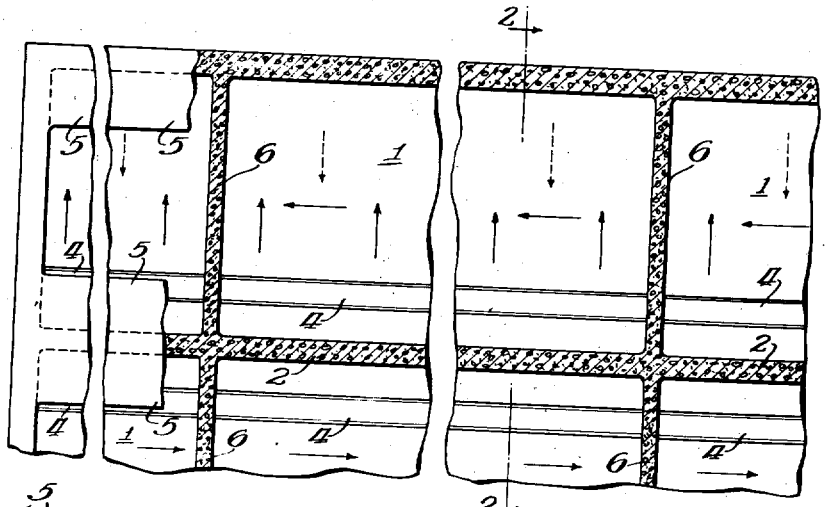
Figure 4:
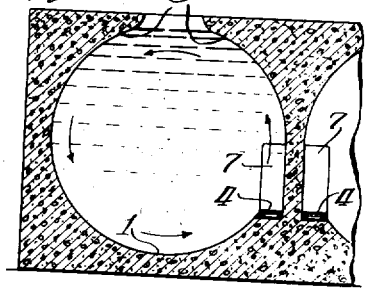
Figure 5:
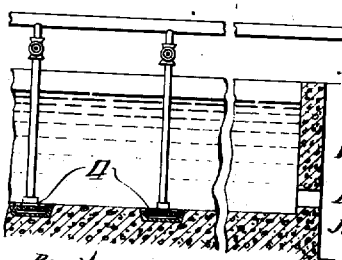

The invention is illustrated in the accompanying drawing, with which it will be further described, and in which Fig. 1 is a cross section of a tank construction according to the invention; Fig. 2 is a section on line 2—2 of Fig. 3, showing a modified form of tank; Fig. 3 is a section on line 3—3 of Fig. 2; Fig. 4 is a broken transverse section of a tank, the form of the invention being modified; and Fig. 5 is a longitudinal section of a tank as illustrated in Fig. 7 of his earlier Patent No. 1,247,540, showing particularly the pipe connections for supplying air to the air diffusers.

Referring to the drawing, 1 represents the bottom of the tank; 2 are longitudinal main and division walls which separate the tank into a plurality of lengths; 3 are the curved lower portions of the tanks connecting the vertical walls with the bottom 1, which is flat between the parts 3; and 4 are the air diffusers disposed longitudinally in the tank, and at the point where the bottom 1 merges into one of the rounded portions 3.

Figure 1 shows a case where the vertical upstream of liquid and air of the transverse circulation in the tank sections to the general direction of flow takes place near one of the walls 2, and the diffusers 4 are near the point of the merging of a curved portion 3 with the bottom 1, while the other curved portion 3 at the other side of the bottom directs and bends the vertical down-stream horizontally over the floor, and the stream being controlled and directed by the bottom formation of the tank and forced by the air upward near one wall 2, a large portion of the air delivered into the liquid will be carried across the top of the tank by the horizontal stream which flows from one side to the other.

In the arrangement shown in Figs. 2 and 3, overhanging flow directing means or part roofs 5 are employed, which are curved or formed on their inner surfaces similarly as the lower curved portions 3.

6 are transverse diaphragms in the tank, which in Fig. 2 have openings 7 at one of their lower angles, adjacent to the air suppliers 4, so that all the liquid from one tank compartment or section formed by these diaphragms has to pass in its general longitudinal flow through the tank, over the air diffusers 4 and become supplied and charged with air bubbles, so that no part of the liquid can flow through the tanks in its general longitudinal flow, without being supplied with and acted upon by the requisite quantity of air.

It will be seen that in this case (Figs. 2 and 3, and also in Fig. 4) the liquid has a general longitudinal flow through the tank and a circulation in a direction at right angles to same within the several compartments or sections, and in the tank shown in Figs. 2 and 3 it is assumed that the liquid will pass first down through one length or reach of tank to its end, and then return through another length or reach, and so on.

It will be seen in connection with Figs. 2 and 3, that the diffusers 4 being near one of the walls 2, the air going through it will produce a column of rising water and air along that side of the tank, and arriving near the top is bent and directed by the upper curved portion 5 (the level of liquid being about that indicated by the shaded lines) from a vertical to a horizontal direction, and the stream traversing horizontally across the open space between the roof parts carries in its flow a large portion of the air bubbles supplied to it, and having reached the opposite part 5, it is again bent and directed downward toward the lower portion 3, which again bends and directs it horizontally across the floor 1, the sweep of the stream being such that no collection and stagnation of sludge can take place on the bottom.

With regard to the modified form of tank shown in Fig. 4, the figure of the transverse section of the tank, internally, is circular instead of a generally rectangular figure, the upper part of the tank being open between the opposite edges of the upper overhanging directing portions 5. The diffusers or air suppliers 4 in this case are shown above the bottom 1, but near one side wall 2, and the passages 7 in the diaphragms 6 are directly in line and above the longitudinally disposed diffusers or air suppliers 4.

By the arrangement and form of tanks, and mode of operating, as herein described, it is possible to obtain a flow of considerable velocity around the periphery of the tank, sufficient to prevent the collection and stagnation of sludge on the bottom, for a relatively small volume of air. For instance, ordinary sludge free from inert matter or detritus can be kept in suspension in the liquid and prevented from depositing and stagnating by a current having a velocity, say, of a quarter to half a foot per second; or if detritus is allowed into the tank, a velocity of about two feet per second is sufficient to keep it in motion and circulation. In the latter case a practically continuous velocity of from a quarter to half a foot per second would be required for the majority of the time, and a higher velocity occasionally by supplying more air, say once an hour for a short time, the duration of which would be sufficient to carry all inert matter or detritus which may be on the bottom to the diffuser.

If a short period of less and greater air supply be arranged at, say every fifteen minutes, the length of time of increased supply and flow of liquid may be from, say 30 to 60 seconds, and this would carry the detritus to the diffuser in each period of increased flow.

It is to be noted that this process of purifying sewage may be carried on in the existing conducting sewers or the like of a sewerage system, which will then in fact constitute the treating tanks or containers. For instance, the sewer may be constructed as set forth with reference to Fig. 4.

What is claimed is:

1. In a purification system, a tank divided into a plurality of communicating open chambers serially connected with one another, each chamber having its sewage inlet at one end and its sewage outlet at the other end, an air supplier for each chamber extending substantially continuously throughout the length thereof nearer to one of the side walls of said chamber than to the opposite wall of said chamber, the side walls of each chamber being formed to direct the flow of liquid under the pressure of said air supplier in a circular path within the chamber, and the flow of sewage through each chamber from the inlet at one end to the outlet at the other end being continuous, causing a generally spiral flow of the sewage within each chamber.

2. A relatively long and slender open sewage purification chamber, an air supplier extending throughout the length and along the bottom in said chamber and located nearer to one than to the other of the vertical side walls of said chamber, the walls of the chamber being rounded to direct the circulation of the sewage caused by the escape of air from said air supplier in a substantially predetermined path horizontally across the top of the chamber, downwardly adjacent the side wall farthest from the air supplier, and again horizontally across the bottom of the chamber toward and over the air supplier, the rounded portion adjacent the floor of the chamber serving also to prevent deposits of solid matter, the sewage to be treated being admitted to said chamber at one end thereof and withdrawn from said chamber at the opposite end thereof so that particles of sewage or solid matter are caused to flow generally spirally through said chamber from one end to the other.

3. A long and slender sewage purification tank divided into independent open chambers serially connected with one another, air suppliers arranged near one side wall and throughout the length in each chamber, the interior surface of the chamber being formed with curved portions relatively arranged to compel the circulation of fluid under the action of the air supplier vertically of and across the upper portion and bottom of said tank, the flow through said chambers from end to end diverting such circulation into a spiral flow within each of the chambers of said tank.

4. A sewage purification tank having side walls and end walls, with transverse partitions dividing the said tank into a pluralty of open chambers, the partitions being formed with openings to permit the circulation of the fluids lengthwise the tank and air suppliers in the chambers, the walls of the chambers being formed to direct the circulation of the sewage under the influence of the air from the suppliers in a direction at right angles to the passage of the sewage through the tank.

ACTIVATED SLUDGE, INC.,
*Assignee of Walter Jones, Deceased,*
By CARL W. JOHNSON,
*President.*